United States Patent [19]

Koberlein et al.

[11] Patent Number: 4,773,666
[45] Date of Patent: Sep. 27, 1988

[54] TRACTOR HITCH WITH IMPROVED MOUNTING MEANS

[75] Inventors: Ross D. Koberlein, Fayette County; Thomas I. Burenga, Montgomery County, both of Ill.

[73] Assignee: Worksaver Inc., Litchfield, Ill.

[21] Appl. No.: 154,423

[22] Filed: Feb. 8, 1988

Related U.S. Application Data

[63] Continuation of Ser. No. 874,433, Jun. 16, 1986, abandoned.

[51] Int. Cl.⁴ .............................................. B60D 1/12
[52] U.S. Cl. ................................ 280/460 A; 172/443; 172/810; 280/461 A; 280/508
[58] Field of Search .......... 280/456 A, 460 A, 461 A, 280/477, 481, 490 A, 497, 508; 172/272, 439, 443, 810, 817

[56] References Cited

U.S. PATENT DOCUMENTS

| | | | |
|---|---|---|---|
| 3,498,638 | 3/1970 | Magruder | 280/461 A X |
| 3,841,415 | 10/1974 | Koenig et al. | 280/460 A X |
| 3,964,622 | 6/1976 | Blair et al. | 172/272 X |
| 4,056,250 | 11/1977 | Uchiyama | 172/272 X |
| 4,173,352 | 11/1979 | van der Lely | 280/460 A X |
| 4,519,623 | 5/1985 | Orthman | 280/461 A |
| 4,600,070 | 7/1986 | Thurner | 172/272 X |

FOREIGN PATENT DOCUMENTS

| | | | |
|---|---|---|---|
| 190717 | 7/1957 | Fed. Rep. of Germany | 280/460 A |
| 2836435 | 3/1980 | Fed. Rep. of Germany | 172/810 |
| 2025748 | 1/1980 | United Kingdom | 172/272 |

*Primary Examiner*—John J. Love
*Assistant Examiner*—Charles R. Watts
*Attorney, Agent, or Firm*—Paul M. Denk

[57] ABSTRACT

A three point or other hitch for use in conjunction with a tractor, preferably for mounting onto its front end, a pair of side plates permanently mount onto the front side edges of the tractor, each side plate incorporating shaped cradles for holding the hitch thereto. The hitch incorporates laterally extending trunions for mounting onto the side plates, and the lift arms of the hitch have a stabilizing plate arranged intermediate thereof, in order to provide enhanced support. Each lift arm incorporates a clamp, at their frontal ends, with each clamp incorporating a support for holding a draw pin, and a dog associated with each clamp for locking the pin into position, but which can be manipulated by a cam for holding the respective dogs out of their locking position, so that any implement can be freed therefrom.

3 Claims, 1 Drawing Sheet

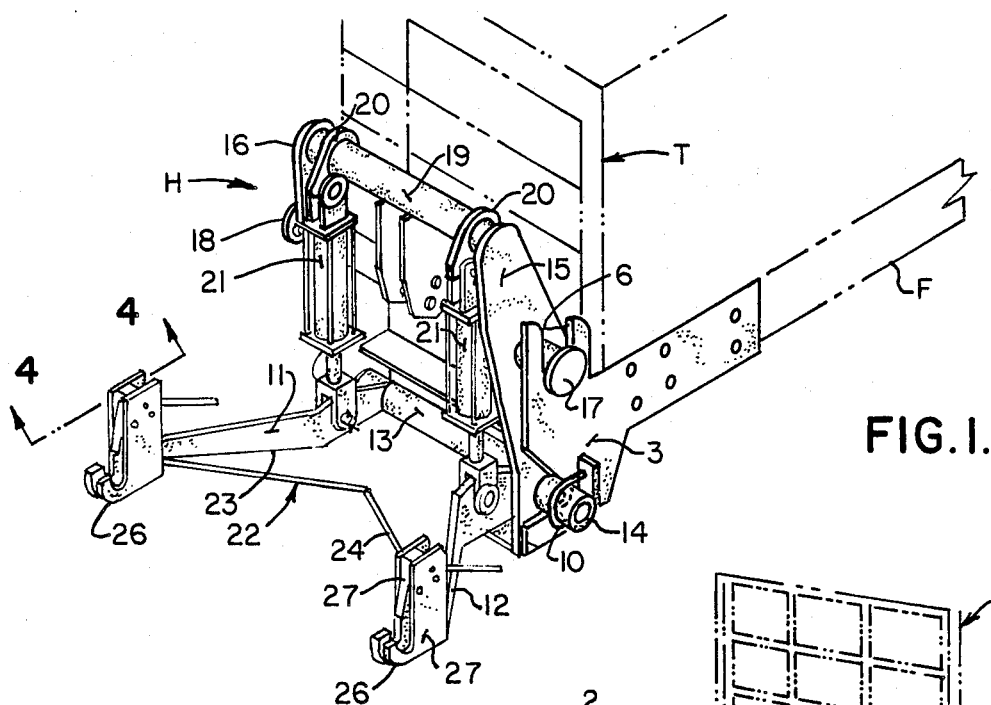
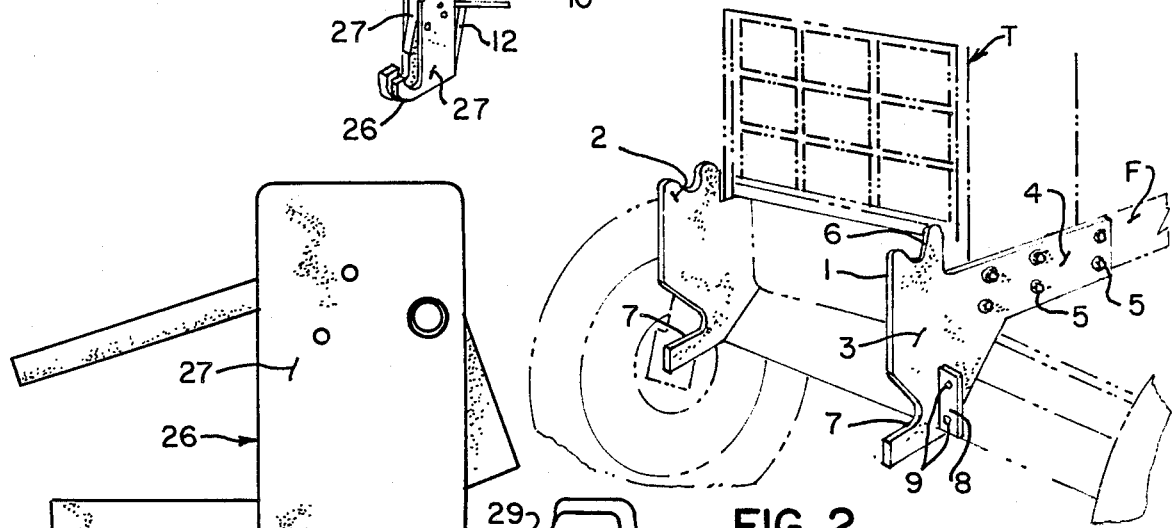
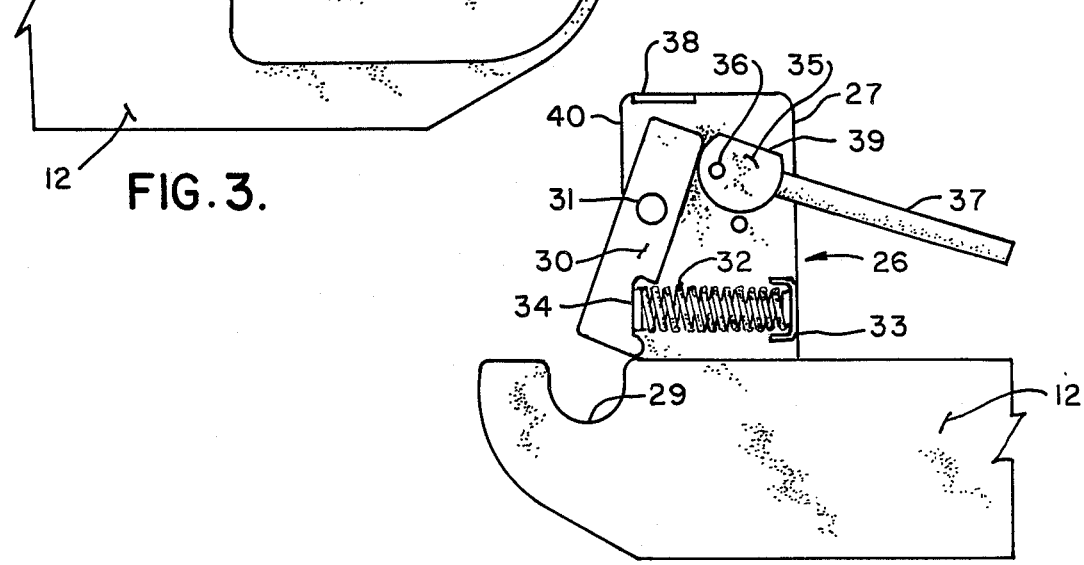
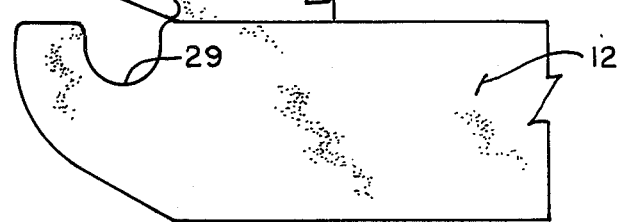

TRACTOR HITCH WITH IMPROVED MOUNTING MEANS

The subject matter of this application is related to and comprises a continuation of the application having Ser. No. 874,433, filed on June 16, 1986, now abandoned, by the same inventors, upon the above-named invention.

BACKGROUND OF THE INVENTION

This invention relates generally to the application of a three point hitch, or related type hitch, to a tractor, and more specifically pertaining to the interconnection of a three point hitch to its tractor, and an implement, while combined with an improved structural reinforcement for the hitch, providing very stable and secure interconnection of any implement to its tractor for sustained usage.

There are a variety of means and apparatuses for securement of hitches to tractors, most of them incorporate what is commonly known as the three point hitch form of connection, and in certain instances, such hitch connecting means may be mounted to the front end of a tractor so as to provide just that, a front end attachment for securement of various implements to such machinery. In these particular instances, the tractor mounting implement, through its hitch, may function for additional purposes other than those as customarily used in conjunction with the tractor, and in these instances, additional implements may be secured to the tractor and for usage for hay bale handling, for spreading fertilizer and seed, convert the tractor into a dozer, provide a cultivator, for snow blowing, pulling vegetables, such as beans and the like, and to act as a pushing device for facilitating the usage of tillage equipment. In addition, utilizing a front end hitch allows the tractor to be used for chemical applications, in the agricultural field, allowing the usage of front mounted sprayers.

Examples of the type of front-end hitches that are available in the art may be seen in the U.S. Pat. No. 4,519,623 to Orthman. The subject matter of this hitch, as disclosed, is very similar and related to the type of front-end hitches that are customarily used in the art, and which normally incorporate a pair of lift arms, pivotally mounted to their side frames, and incorporate upper arm structure that secure hydraulic cylinders for providing lift to the arms during their manipulation while attached to any implement, or for shifting of the implement itself during application. But, one of the drawbacks of the available type of hitches is the method in which they are mounted to their tractor, since most of such mountings include and require the bolting of the three point hitch thereto, which is time consuming, and through loosening or fracturing of such bolted connections, the likelihood of failure does exist, particularly during those most dangerous times when the hitch, and its implement, are subjected to heaviest dynamic loading such as occurs during road speed transport. If the bolts should come loose or fail, a loss of the hitch and its implement can occur, and the results can be deadly. In addition, there are some problems with the prior art type of hitches in their methods and means for attachment of the various implements thereto. These earlier devices require a perfect alignment of the draw pin on the implement with the hole of the ball on the ends of the lift arms, before interconnecton can be made between the two components.

Other type of hitch connecting mechanisms, for use with a tractor, and some of which incorporate a front end mounted hitch, are shown in the earlier U.S. Pat. Nos. 3,145,781 to Rogler, and 3,255,828 to Abbott. The patent to Markwardt, U.S. Pat. No. 3,201,878, shows the attachment of a plow means to the front of a vehicle, such as a tractor, truck, or the like. The U.S. Pat. No. 4,181,181 to Old, shows a tractor implement hitch that likewise connects an implement to the forward end of a tractor. Other United States patents in this related art include U.S. Pat. Nos. 4,103,443, 4,194,756, 3,529,852, 3,387,862, 3,704,534, 2,749,823, and 3,910,355. Various foreign patents or publications are available in this art, and one is a three point linkage connection for an implement to a tractor as shown in the British patent No. 1,500,179. In addition, the French patent No. 2,475,347, shows a quick action front tractor implement hitch, which appears to have some form of cradle mounting means provided at the front ends of its arms.

In view of the foregoing, it is the principal object of this invention to provide connecting means structured into a three point or related hitch and which facilitates the mounting of the hitch to its tractor, and likewise simplifies the method and structure required for fastening of the implement thereto.

An object of this invention is to provide a means and method for securement of a tractor hitch to the front end of the tractor, through the application of a pair of side plates extending for some distance along the frontal side of the tractor so as to assure a more permanent and stable installation of any hitch thereto.

Another object of this invention is to provide a tractor hitch, in conjunction with cradle disposing side plates, which stably and easily support the hitch during its installation, and prevents the likelihood of its unauthorized or untimely loosening.

Still another object of this invention is to provide a tractor hitch, and its securement through side plates to the front end of a tractor, and which incorporates fastening means that provide for a more permanent securement of the hitch to its tractor.

Still another object of this invention is to provide a tractor hitch, incorporating a stabilizing plate, which usually extends the full distance between the lift arms for the hitch and in this manner provides a substantially structurally reinforced hitch for use in the holding of a variety of implements to the tractor.

Yet another object of this invention is to provide a reinforcing means in the form of a stabilizer plate that substantially and structurally reinforces the lift arms for the heavy load and implement conveying hitch.

Yet another object of this invention is to provide clamp means, generally functioning as claw means, and which effectively and without personal participation can easily clamp onto an implement, and lock it into position without further manipulation.

Still another object of this invention is to provide cam means used in conjunction with clamp means and effectively can hold the dog of the clamps into an opened position so as to assure and facilitate the release of the implement from the hitch during a disengagement.

These and other objects will become more apparent to those skilled in the art upon reviewing the summary of this invention, and upon undertaking a study of the description of its preferred embodiment, in view of the drawing.

SUMMARY OF THE INVENTION

This invention contemplates improvements structured into a three point hitch, and when fabricated in the manner as herein after described, enhances the structural support and interconnection of the three point or other hitch to the front of the tractor, in addition to easing the engagement, or release, of a variety of implements with respect thereto. Essentially, this invention is formed incorporating three basic improvements, one is the application of side plates more permanently to and along the front sides of the tractor, with the plates being permanently installed thereat, to either side of the tractor front, and be readily available for immediate application of its hitch, as required. These side plates are fabricated incorporating especially designed and integrally formed cradles, and which are disposed for easily supporting and tenaciously fastening onto the associated hitch, at least at more than three locations of joining between the three point hitch, and its supporting side plates, so as to assure a stable and more permanent hold onto the hitch once installed. In addition, fastening means, generally in the nature of U-bolts, co-operate with fastening plates that assure a firm retention of the hitch to the tractor, once mounted thereon.

Another attribute of this invention is the location of a stabilizing plate that is integrally welded or otherwise secured along the length of the lift arms, and which plate functions to add enhanced structural stability to the lift arms, as the two arms are operated simultaneously, so as to add to the overall strength and application of the hitch, particularly when holding any of a variety of heavy implements thereto, or when lifting the same through their cantilevered movements. But, in addition, the invention envisions there being a slit or space between or along the center of the stabilizing plate, so that a pair of such plates will be welded to their respective lift arms, and add structural rigidity thereto as when the lift arms may be independently operated, particularly when the lift arms must have the ability to free float in relationship to each other as when an implement may be riding over rather irregular or rugged terrain.

A further attribute of this invention, and which adds greatly to the structure of this improved hitch, is the mounting of clamp means onto the front of each lift arm, and which clamp means are designed for independent functioning, for either clamping onto, or releasing, with respect to any implement, so as to assure their convenient operation, while locking onto any implement during its installation. Each of these clamp means incorporates a frame member, with each of the frame members having a forwardly extending support for engagement with and holding onto an associated and co-operating part of an implement, and with each frame member also including a pivotal dog disposed upwardly therefrom, and which is spring biased into its normally closed and locking position. Thus, as the three point hitch is brought into alignment with the draw pins on the implement, a simple lifting of the hitch through its hydraulic cylinders automatically locks the lift arms to the installed implement. Thus, this particular feature can be achieved without even any need for the farmer/operator to connect the lift arms to the equipment initially, which must be done with the state of the art style of hitches under their normal usage.

BRIEF DESCRIPTION OF THE DRAWING

In referring to the drawing,

FIG. 1 provides an isometric view of the three point or other hitch of this invention shown installed by means of one of its side plates to the front end of a tractor;

FIG. 2 provides a similar view to that of FIG. 1, showing a pair of side plates mounted along the front side and along the length of the tractor, but with the three point hitch being removed;

FIG. 3 is a side view of one of the clamp means normally provided at the front of a lift arm for the shown hitch; and FIG. 4 is a sectional view of the clamp means shown in FIG. 3, taken along the line 4—4 of FIG. 1.

DESCRIPTION OF THE PREFERRED EMBODIMENT

In referring to the drawings, and in particular FIG. 1, the tractor hitch assembly H of this invention is shown, and is disclosed as being mounted onto the front of the tractor T, as disclosed in phantom line. While the hitch assembly of this invention is disclosed, as in its preferred embodiment, as mounting onto the front of a tractor, it is likely that the subject matter of this invention could be adaptable to mounting onto the rear thereof, although the front mount is what comprises the principal concern of this development. As can be seen in FIG. 2, the mount assembly includes a pair of side plates 1 and 2, with each side plate having a particular configuration, as noted, having a frontal enlarged vertically arranged plate portion 3, which is integrally formed with a rearwardly extending longitudinal portion 4, and which, as can be seen, that portion 4 is designed to provide a sufficient length of plate for reasonably permanent securement, by means of the bolts 5, to the structural framework F of the tractor, as can be noted. Thus, the side plates can be permanently mounted onto the approximate front end of the tractor, and be left thereon, always ready and available to receive and mount the hitch H thereon, as required, particularly when various implements are designed for use in conjunction with this development, and such implements of the type as previously explained in the summary herein.

It can be seen that the frontal vertically arranged plate portion 3 is particularly configured, as can be seen, having each a pair of cradle-like segments 6 and 7, with these two particular shaped members functioning as cradles for holding various segments of the configured hitch thereon, during its installation and application for attachment of an implement to the tractor. In addition, each of the side plates incorporates another plate, as at 8, extending laterally therefrom, with each of these plates having, as can be seen, apertures, as at 9, or the like, and disposed for reception of a U-bolt, as at 10 (See FIG. 1.) when it is desired to lock a hitch into place upon the front end of the shown tractor.

In referring once again to FIG. 1, the hitch H is more generally disclosed, and it incorporates various components which are rather of standard use in the trade. Generally, a hitch of this type incorporates a pair of lift arms 11 and 12, which are mounted, at their rear ends, to a bearing sleeve 13, and which sleeve is designed for pivotal movement upon a lower shaft 14, a part of which is shown extending through one of the side frames 15 of the hitch. There is a pair of side frames 15 and 16 provided in the structure of the hitch, and affixed to approximately the lower ends of each side frame is the shaft 14, as noted. The shaft 14 extends laterally, of each of the side frames 15 and 16, and these extending portions of the shaft 14 are designed for inserting within the lower cradles 7 formed of each of the side plates 2 and 3. It is these laterally extending portions of the lower shaft 14 upon which the U-bolts 10 secure about in their attachment with the extending plates 8 that are fastened with each of the said side plates 2 and 3, as previously explained. This effectively locks the hitch onto the side plates 2 and 3, and consequently, to the tractor T itself. As can also be seen, a pair of trunions 17 and 18 are integrally affixed and extend from the side frames 15 and 16, and these trunions are designed for insertion within the upper cradles 6 formed within each of the side plates 2 and 3, as can be noted. Thus, when the hitch H is assembled to the side plates 2 and 3, in this particular manner, through the cradling of its upper and lower trunions, or shafts, 14, 17 and 18, within the respectively formed cradle-like members formed within the shaped side plates 2 and 3, the hitch rigidly secures in place to the tractor, for continuous and repeated usage for holding of a variety of implements thereto during application.

The hitch further includes an upper shaft 19, affixed between the upper edges of the side frames 15 and 16, and thereby stabilizes the locating of the side frames within the hitch structure. Mounting to the upper shaft 19, through the links 20, are one or more hydraulic cylinders 21, with the cylinders, at their lower ends, being pivotally secured with the lower lift arms 11 and 12, respectively. Thus, it can be seen that the actuation of the hydraulic cylinders 21 provides for the raising or lowering of the lift arms, during hitch manuevering, as when it is being brought into engagement with an implement, or during operation of the implement through its usage upon the tractor T.

Another aspect of this invention is the provision of means for stabilizing the lower lift arms 11 and 12 during their operations. As can be seen, a unitary stabilizer plate 22 is provided spanning the space between the shown lift arms, with the plate along its outer edges, being secured integrally with and along approximately the entire length of each lift arm, as can be noted at 23. The back end of the plate 22 is integrally secured with the bearing sleeve 13. Thus, full structural support is provided between the lift arms 11 and 12, and the bearing sleeve 13, so as to assure enclosed strength stability in the functioning of this lower assembly, while the hitch is being operated, particularly when pulling or lifting a heavy implement that may be attached thereto. In addition, and where it may be desired, the stabilizer plate can be formed having cut out segment along its frontal edge, as at 24, in order to add to the convenience of its use, and a slit may be provided along the central length of the stabilizer plate 22, and likewise provided around the bearing sleeve 13, so that the stabilizer plate may be segregated into two components, each of which is respectively integrally secured with its lower lift arm, and bearing sleeve segment, so as to provide structural rigidity for each of those paired components, where the lift arms are desired to be operated separately, and independently of each other, through its respective hydraulic cylinders 21. This may be desirable and preferable where the type of implement being conveyed may be moved over rather rough terrain, such as freshly plowed fields, and where the implement will require some free floating of particular of its wheels, along its transverse width, and thereby necessitate independent movement of the various lift arms 11 or 12, during such maneuvering. This can be achieved by providing that type of a slit, as at 25, along the length of the stabilizer plate, and its respectively attaching bearing sleeve 13.

As can also be seen in FIG. 1, in addition to FIGS. 3 and 4, each of the lift arms 11 and 12 have attaching to their frontal ends a clamp means 26. Each of these clamp means are designed for securing onto the draw pins of the implement to which the hitch is designed for attachment to the tractor T. Each of these clamp means 26 is formed of a frame means or member 27, comprising a pair of frame plates 27, with the bottom of each frame member being shaped into a forwardly extending support, as at 28, and arranged intermediate the pairs of frame plates 27 may be at integrally extending frontal portion of the associated lower lift arm 11, or 12, as can be noted. Thus, the clamp means 26 is designed for integrating into the structure of each lift arm, so as to provide a cradle-like support means, as at 28, formed having an upwardly disposed opening 29, and into which the draw pins of the implement may insert, during installation. And, provided for locking the implement to the clamp means, and thence to the hitch and tractor themselves, is a pivotal dog 30 pivotally mounted by means of the pin 31. A spring means 32 connects between a rear bracket 33, formed between the frame members 27, and a cooperating slot 34, formed at the lower backside of each of the dog members 30. The spring 32 is designed for biasing the dog, as can be seen, pivoted forwardly at its lower end, to maintain a permanent locking position against any draw pin (not shown) of an implement that has been cradled by the combined frame member 26 and the respective lower lift arm 11 or 12, as can be noted. Thus, because of the bias of the spring 32, as the hitch H is brought into contact with the draw pins of any implement, the draw pins will force against the dogs 30, particularly at their lower ends, and push against the bias of the spring 32, thereby pivoting the dog into a more vertical alignment, opening the cradle portion 29, so that the implement pin can slide therein as the hitch is slightly lifted. Once this occurs, the dog 30 will pivot outwardly, once again, as shown if FIG. 4, and lock the implement draw pins into their fixed positions.

As can also be seen in FIG. 4, there is provided a cam means 35 pivotally mounted by means of a pin 36 between the frame members or plates 27, with the cam means being eccentrically pivotally mounted as can be seen. Extending from the cam means is a lever 37 which extends externally of the spacing between the frame members 27, with the lever being disposed for ease of manipulation by the operator. When the cam means is pivoted in one direction, as that which is shown in FIG. 4, its camming surface arranged adjacent the upper edge of the dog 30 has a disposition which allows for the free extending pivot of the lower end of the dog to the position as shown. In this particular position, the dog is free to remain in its locking disposition, as shown, or it can be forced inwardly, into a more vertical alignment with its frame member 27, as when an implement, and more specifically its proximate draw pin, is being inserted within, the support means 28. On the other hand, when it is desired to particularly remove an implement from its hitch, under those circumstances, it is necessary that means be provided for permanently removing the dog 30 extension from each clamp means, and this can be done as follows. When such is required, the lever 37 is pivoted upwardly, into a more vertical disposition, until such time as it comes into approximate engagement with the stop 38, and when such a relationship occurs, the cam means 35 will have been pivoted approximately more than ninety degrees, until such time as its camming surface, as at 39, pivots into contact against the back upper edge of the dog 30. When that occurs, the surface 39, through the eccentric mounting of the cam means 35, forces the upper edge of the dog outwardly, thereby pivoting the lower edge of the dog into the space between the frame members 27, until such time as the dog is reasonably vertically aligned with the front edge 40 of the frame, meaning that the dog is now clear and free of the slot or cradle 29 of the support 28. Under that condition, the implement draw pins will be free to slide out of the support 28, as when the tractor operator lowers the hitch H, and more specifically its lift arms 11 and 12, until such time as the clamp means 26 are cleared from the implement. Thus, when maintained in that position, the clamp means can be freely released from the implement, and the tractor and its hitch may be removed therefrom, for other uses.

It might be commented that the stop means 38 also acts as an upper brace between the frame members or plates 27, in order to maintain adequate clearance, at the upper segment of the frame means, forming the clamp of this design.

It should be obvious that these clamp means have other uses for holding other type components together.

Variations or modifications to the subject matter of this invention may occur to those skilled in the art upon reviewing the invention described herein. Such variations or modifications, if within the spirit of this invention, are intended to be encompassed in the scope of any claims to patent protection issuing upon this development. The description of the preferred embodiment set forth herein is done so for illustrative purposes only.

Having thus described the invention what is claimed and desired to be secured by Letters Patent is:

1. A clamp means for use for holding one component to another, said clamp means including a frame means, said frame means including a forwardly extending formed support for engagement with and holding said components fixed together, a pivotal dog means provided upon the frame means upwardly of its formed support and arranged in approximate alignment therewith for locking any held component to the clamp means, spring means connected within the frame means and biasing against the dog means to urge it normally into its component locking position, means for fixing said dog means into an unlocked position, said fixing means including a cam means disposed in contiguous contact with an end of the said dog means, a lever means connecting with the said cam means and provided for facilitating the pivoting of the cam means between its actuation of the dog means into its locking and unlocking positions, said cam means being eccentrically and pivotally mounted to the said frame means, whereby said cam means when pivoted in one direction maintaining said dog means into its locking position, and when pivoted into an opposite direction freeing said dog means for movement to and maintaining an unlocked component position.

2. In a tractor hitch of the type normally used in providing a three point or other connection of an implement to a tractor, the hitch incorporating a pair of lift arms secured at their back ends with a bearing sleeve, a pair of side frames having a lower shaft extending intermediate thereof, and said bearing sleeve and its lift arms mounting upon said shaft for pivotal movement thereon, an upper shaft extending between the approximate upper ends of said side frames, a hydraulic cylinder means pivotally connected between said upper shaft and the lift arms to provide means for raising or lowering the lift arms during hitch usage, the improvement which comprises a unitary stabilizer plate permanently interconnecting between said lift arms and providing structural rigidity to the said lift arms in supporting an implement in its connection to the tractor, said stabilizer plate having a cut-out portion proximate its central front edge, the side edges of the stabilizer plate being integrally secured along their length with their respective lift arms, said lift arms and reinforcing stabilizer plate provided for simultaneous movement during actuation of the hydraulic cylinder means, a pair of side plates provided from permanent mounting to the front side of a tractor, each side plate at its front edge having a pair of cradles formed thereat, said cradles being arranged as upper and lower cradles, each side frame of the hitch having a pair of upper and lower trunions extending laterally therefrom and aligned with and disposed for seating within the respective side plate cradles, and providing for mounting of the hitch to the tractor, locking means provided for securement of said hitch to the said tractor side plates, said locking means including a plate affixed to each side plate aligned and adjacent each lower cradle, each plate having a pair of apertures provided therethrough, bolt means disposed for embracing the lower hitch trunion and extending through the plate apertures, and fastening means engaging the bolt means for securement of the trunions and its hitch to the tractor, each side plate having an integral and substantially rearwardly extending portion, and said side plate portions being disposed for permanent mounting to the front sides of any associated tractor, and means provided at the front of each lift arm for securement of an implement to the tractor hitch, said securement means comprising a self-locking clamp means.

3. The invention of claim 2 and wherein each clamp means including a frame means, said frame means having a forwardly extending support for engaging with and holding part of the implement thereto, a pivotal dog means provided upon each frame means upwardly of its formed support and arranged in approximate alignment therewith for locking the implement to the said clamp means, and spring means secured within the frame means and biasing against the dog means and provided for urging it normally into its locking position, means for fixing said dog means into an unlocked position, said fixing means including a cam means disposed in contiguous contact with an upper end of the said dog means whereby said cam means when pivoted in one direction maintaining said dog means into its hitch locking position, and when pivoted in its opposite direction freeing and fixing said dog means for movement to and sustaining an unlocked position, said cam means being eccentrically pivotally mounted to the said frame means, and lever means connecting with the cam means and provided for facilitating the pivoting of said cam means between its dog means locking and unlocking positions.

* * * * *